US011057738B2

(12) United States Patent
Aksamit

(10) Patent No.: US 11,057,738 B2
(45) Date of Patent: *Jul. 6, 2021

(54) ADAPTIVE CONTEXT DETECTION IN MOBILE DEVICES

(71) Applicant: CONTEXT DIRECTIONS LLC, New York, NY (US)

(72) Inventor: Pawel Aksamit, Opole (PL)

(73) Assignee: CONTEXT DIRECTIONS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,863

(22) Filed: Nov. 7, 2018

(65) Prior Publication Data

US 2019/0075429 A1     Mar. 7, 2019

Related U.S. Application Data

(63) Continuation of application No. 15/719,881, filed on Sep. 29, 2017, now Pat. No. 10,142,791, which is a
(Continued)

(30) Foreign Application Priority Data

Feb. 17, 2012     (PL) .......................................... 398136

(51) Int. Cl.
*H04W 4/02*     (2018.01)
*H04W 52/02*     (2009.01)
(Continued)

(52) U.S. Cl.
CPC ........... *H04W 4/027* (2013.01); *H04W 4/025* (2013.01); *H04W 24/02* (2013.01);
(Continued)

(58) Field of Classification Search
CPC ..... H04W 4/027; H04W 4/025; H04W 24/02; H04W 24/00; H04W 52/0254;
(Continued)

(56) References Cited

U.S. PATENT DOCUMENTS 5,592,173 A    1/1997    Lau et al.
6,039,316 A *   3/2000    Jackson ................. B65H 5/066
                                                                                 271/194

(Continued)

FOREIGN PATENT DOCUMENTS

WO     2010/133770     11/2010
WO     2012/001215     1/2012

OTHER PUBLICATIONS

Kang, Sungwoo et al.,"MobiCon: Mobile Context Monitoring Platform for Sensor-Rich Dynamic Environments", Dec. 1, 2010, 14 pages, retrieved from <http://www.csc.lsu.edu/~iyengar/final-papers/CACM_m.pdf>.
(Continued)

*Primary Examiner* — Mong-Thuy T Tran
(74) *Attorney, Agent, or Firm* — Jason H. Vick; Sheridan Ross, PC

(57) ABSTRACT

A method for detecting a context of a mobile device equipped with sensors and a context detection module in which the sensors are assigned to at least two groups, each of which comprises at least one sensor, and each group is allocated a group classifier adapted to detect, in a form of a classification result, currently identified, by means of a given classifier, context of the device based on indications of the sensors belonging to the given group, characterized in that with a use of the context detection module, whereas the groups of sensors are ordered hierarchically, and the device context is detected by reading a classification result indicated by the classifier of the currently active group, wherein in case of detection of an identified context in the active
(Continued)

group, switching on power supply of the sensors and activating classification in a group with a level higher by one level and reading the context indicated by said group's classifier, wherein based on the results of the classification indicated by the higher groups' classifiers, executing adaptation of the configuration of lower groups' classifiers.

32 Claims, 5 Drawing Sheets

Related U.S. Application Data continuation of application No. 15/377,414, filed on Dec. 13, 2016, now Pat. No. 9,807,564, which is a continuation of application No. 14/745,433, filed on Jun. 21, 2015, now Pat. No. 9,549,292, which is a continuation of application No. 14/346,985, filed as application No. PCT/EP2013/052187 on Feb. 5, 2013, now Pat. No. 9,107,093.

(51) Int. Cl.
| | |
|---|---|
| H04W 24/02 | (2009.01) |
| H04M 1/725 | (2021.01) |
| H04M 1/72454 | (2021.01) |
| G06F 3/01 | (2006.01) |
| H04L 29/08 | (2006.01) |
| H04W 24/00 | (2009.01) |

(52) U.S. Cl.
CPC ......... *H04W 52/0254* (2013.01); *G06F 3/017* (2013.01); *H04L 67/22* (2013.01); *H04M 1/72454* (2021.01); *H04M 1/72569* (2013.01); *H04W 24/00* (2013.01); *Y02D 30/70* (2020.08)

(58) Field of Classification Search
CPC ........ Y02D 70/26; Y02D 70/00; Y02D 30/70; G06F 3/017; H04L 67/22; H04M 1/72569
USPC ...................................................... 455/456.1
See application file for complete search history.

(56) References Cited

U.S. PATENT DOCUMENTS

| | | | |
|---|---|---|---|
| 6,522,266 B1 | 2/2003 | Soehren et al. | |
| 7,203,635 B2 | 4/2007 | Oliver | |
| 7,778,632 B2 | 8/2010 | Kurlander et al. | |
| 7,986,914 B1 | 7/2011 | Henry, Jr. et al. | |
| 8,355,751 B2 | 1/2013 | Dietz et al. | |
| 8,384,589 B2 | 2/2013 | Watanabe et al. | |
| 8,417,296 B2 | 4/2013 | Caballero et al. | |
| 8,725,171 B2 | 5/2014 | Keating et al. | |
| 8,907,924 B2* | 12/2014 | Han ..................... | G06F 3/0418 345/175 |
| 9,107,093 B2 | 8/2015 | Aksamit | |
| 9,549,292 B2 | 1/2017 | Aksamit | |
| 9,807,564 B2 | 10/2017 | Aksamit | |
| 10,142,791 B2 | 11/2018 | Aksamit | |
| 2002/0054174 A1* | 5/2002 | Abbott .................... | G06F 3/011 715/863 |
| 2002/0128000 A1 | 9/2002 | do Nascimento, Jr. | |
| 2003/0139654 A1 | 7/2003 | Kim et al. | |
| 2003/0197597 A1 | 10/2003 | Bahl et al. | |
| 2004/0002838 A1 | 1/2004 | Oliver et al. | |
| 2005/0255874 A1 | 11/2005 | Stewart-Baxter et al. | |
| 2006/0068705 A1* | 3/2006 | Pidwerbetsky ......... | H04Q 9/00 455/41.2 |
| 2006/0080480 A1* | 4/2006 | Udou ................ | H04L 12/40013 710/29 |
| 2006/0119508 A1 | 6/2006 | Miller | |
| 2007/0100480 A1 | 5/2007 | Sinclair et al. | |
| 2007/0112701 A1* | 5/2007 | Chellapilla ............ | G06N 20/00 706/15 |
| 2008/0143518 A1 | 6/2008 | Aaron | |
| 2008/0189227 A1* | 8/2008 | Kandregula ........... | G06N 20/00 706/10 |
| 2008/0195584 A1 | 8/2008 | Nath et al. | |
| 2008/0235318 A1 | 9/2008 | Khosla | |
| 2009/0098880 A1 | 4/2009 | Lindquist | |
| 2009/0128286 A1 | 5/2009 | Vitito | |
| 2009/0221279 A1 | 9/2009 | Rutledge | |
| 2010/0005419 A1* | 1/2010 | Miichi ................... | G06F 3/0362 715/828 |
| 2010/0048256 A1 | 2/2010 | Huppi et al. | |
| 2010/0075652 A1 | 3/2010 | Keskar et al. | |
| 2010/0151916 A1 | 6/2010 | Baek et al. | |
| 2010/0164720 A1* | 7/2010 | Kore ....................... | H04W 4/02 340/541 |
| 2010/0210301 A1 | 8/2010 | Dietz et al. | |
| 2010/0229187 A1* | 9/2010 | Marwah .............. | G06F 11/3058 719/318 |
| 2010/0302028 A1 | 12/2010 | Desai et al. | |
| 2010/0306711 A1 | 12/2010 | Kahn et al. | |
| 2011/0243448 A1 | 10/2011 | Kawabuchi | |
| 2011/0310005 A1 | 12/2011 | Chen et al. | |
| 2012/0059780 A1 | 3/2012 | Kononen et al. | |
| 2012/0100895 A1 | 4/2012 | Priyantha et al. | |
| 2012/0185419 A1 | 7/2012 | Kuhn et al. | |
| 2013/0158686 A1 | 6/2013 | Zhang et al. | |
| 2013/0173513 A1 | 7/2013 | Chu et al. | |
| 2013/0238535 A1 | 9/2013 | Leppanen et al. | |
| 2014/0156659 A1* | 6/2014 | Grokop ............. | H04M 1/72563 707/737 |

OTHER PUBLICATIONS

Wang, Yi et al., "A Framework of Energy Efficient Mobile Sensing for Automatic User State Recognition," Proceesings of 7th Annual International Conference on Mobile Systems Applications and Services (MobiSys), 2009, pp. 179-192.

International Search Report and Written Opinion for International (PCT) Patent Application No. PCT/EP2013/052187, dated Jun. 6, 2013, 10 pages.

International Preliminary Report on Patentability for International (PCT) Application No. PCT/EP2013/052187, dated May 4, 2016, 21 pages.

Notice of Allowance for European Patent Application No. 13706937. 3, dated Mar. 12, 2015, 2 pages.

Notice of Allowance (with English translation) for Japanese Patent Application No. 2014-545319, dated Oct. 20, 2014, 5 pages.

Official Action for U.S. Appl. No, 14/346,985, dated Nov. 25, 2014, 24 pages.

Official Action for U.S. Appl. No. 14/346,985, dated Mar. 23, 2015, 15 pages.

Notice of Allowance for U.S. Appl. No. 14/346,985, dated Jun. 9, 2015, 10 pages.

Official Action for U.S. Appl. No. 14/745,433, dated Mar. 31, 2016, 18 pages.

Notice of Allowance for U.S. Appl. No. 14/745,433, dated Sep. 8, 2016, 8 pages.

Official Action for U.S. Appl. No. 15/377,414, dated Feb. 3, 2017, 10 pages.

Notice of Allowance for U.S. Appl. No. 15/377,414, dated Jun. 30, 2017, 8 pages.

Notice of Allowance for U.S. Appl. No. 15/719,881, dated Jul. 20, 2018, 10 pages.

*Context Directions LLC v. Samsung Electronics Co. LTD* U.S. District Court for the Western District of Texas Waco Division; Civil Action No. 6:20-cv-01063-ADA.

*Context Directions LLC v. LG Electronics, Inc.*; U.S. District Court for the Western Division of Texas Waco Division; Civil Action No. 6:20-cv-011064-ADA.

Abdesslem, Fehmi Ben et al. "Less is More: Energy-Efficient Mobile Sensing with Senseless" *MobiHeld '09*; Barcelona, Spain; Aug. 17, 2009.

(56) References Cited

OTHER PUBLICATIONS

Alban, Santiago et al. "Performance Analysis and Architectures for INS-Aided GPS Tracking Loops" Proceedings of the 2003 National Technical Meeting of the Institute of Navigation; Anaheim, CA; Jan. 2003.
Logsdon, Tom "Understanding the Navstar GPS, GIS, and IVHS" Chapter 4; Second Edition; Springer, Oct. 31, 1995.
Paek, Jeongyeup et al. "Energy-Efficient Rate-Adaptive GPS-based Positioning for Smartphones" *MobiSys'10*; San Francisco, CA; Jun. 15-18, 2010.
Intention to Grant for European Patent Application No. 13706937.3, dated Oct. 29, 2014.
Examination Report for Indian Patent Application No. 2269/DELNP/2014, dated Nov. 20, 2018.
Search Report for Polish Application No. P.398136, dated Jul. 25, 2012.
Request for Ex Parte Reexamination of U.S. Pat. No. 10,142,791, U.S. Appl. No. 90/014,712, filed Mar. 29, 2021, including Exhibits 1001-1003; Exhibit AA, Exhibit BB, and Exhibit CC; 738 pages.
Documents filed with U.S. District Court Proceedings for *Context Directions LLC* v. *Samsung Electronics Co. Ltd*; U.S. District Court for the Western District of Texas Waco Division; Civil Action No. 6:20-cv-01063-ADA; Includes publicly available documents filed from Nov. 17, 2020-Mar. 9, 2021; (137 pages).
Documents filed with U.S. District Court Proceedings for *Context Directions LLC* v. *LG Electronics, Inc.*; U.S. District Court for the Western District of Texas Waco Division; Civil Action No. 6:20-cv-01064-ADA; Includes publicly available documents filed from Nov. 17, 2020-Mar. 9, 2021; (120 pages).
Order Granting Request for Ex Parte Reexamination for U.S. Appl. No. 90/014,712, mailed Apr. 29, 2021.

\* cited by examiner

ADAPTIVE CONTEXT DETECTION IN MOBILE DEVICES

CROSS-REFERENCE TO RELATED APPLICATIONS

This is a continuation of U.S. patent application Ser. No. 15/719,881, filed Sep. 29, 2017, now U.S. Pat. No. 10,142,791, which is a continuation of U.S. patent application Ser. No. 15/377,414, filed Dec. 13, 2016, now U.S. Pat. No. 9,807,564, which is a continuation of U.S. patent application Ser. No. 14/745,433, filed Jun. 21, 2015, now U.S. Pat. No. 9,549,292, which is a continuation of U.S. patent application Ser. No. 14/346,985, filed Mar. 25, 2014, now U.S. Pat. No. 9,107,093, which is a national stage entry of PCT Patent Application Serial No. PCT/EP2013/052187, filed Feb. 5, 2013, which claims priority to Polish Patent Application No. P. 398136, filed Feb. 17, 2012, each of which are incorporated herein by reference in their entirety.

FIELD OF THE INVENTION

The present invention relates to a method for detecting context of a mobile device and to a mobile device having a context detection module, especially to detect that the mobile device is located in a moving vehicle.

BACKGROUND

A desirable feature of mobile devices, such as mobile phones, laptops, PDAs, tablets, watches, music players, satellite navigation devices, cameras, is awareness of the device regarding the environment in which it is located, the current activity of the user and/or the circumstances in which the user finds himself, which together are called the "context" in the reminder of this description. Awareness of the context can help to improve the usability of the device, as well as the comfort and safety of its use.

Today's mobile devices are equipped with a large number of different types of sensors, which allow, inter alia, automatic activation and deactivation of individual functions or to change configuration of mobile devices, depending on the context. In most cases, the sensors indicate the context only indirectly. Therefore, there are carried out in the industry intense developments of effective and efficient methods for determining the context based on signals from various types of sensors.

A special case of context is a situation when a user of a mobile device drives a vehicle, such as a car. It is inadvisable in such circumstances, and in many countries prohibited by law to use such devices' functions so as make and receive voice calls and send and receive text messages. On the other hand, in those circumstances, it might be advantageous to activate other functions, such as navigation or download from an external database of information on known hazards on the roads and to inform the user of approaching them, with a message of a tone, voice, visual, or any combination thereof.

One of the known ways of detecting that the mobile device is located in a moving vehicle is to determine its approximate position on the basis of signals of base stations of cellular telephony and calculating average speed of the device based on the change of thus determined position in time. Position the device specified according to the aforementioned method is typically uncertainty in the order of few hundred meters to several kilometers. The greater the movement of the device in time, the greater the certainty of the weighted average speed. In a practical use this means a compromise between a delay in detection of movement in a vehicle of up to several minutes in the teens, and acceptance of frequent false classifications indicating the movement of the device in a vehicle at times when this is not actually happening.

Another well-known and used method of detecting that a mobile device is in a moving vehicle is to analyze the movement speed of the device using a global satellite positioning system, which provides much more accurate positioning than the signals of mobile communications base stations. Receivers of this type, however, consume significant amounts of energy, which significantly reduces the operating time of the mobile device using battery, often to such levels that are unacceptable to the user. Power consumption is reduced in many cases by less frequent switching the receiver on and less frequent positioning. However, this leads to a delay in detection of the identified context. Given the relatively small capacity of the batteries used in mobile devices, a compromise that can be achieved in this method between the movement detection delay and energy consumption can be unsatisfactory for many applications.

The patent application U.S. 2002/0128000 A1 discloses a system for use in a mobile communication device. The system includes a subsystem used for detection of movement of a device in a vehicle. Detection is performed by measuring the average speed of movement of the device, determined on the basis of signals from mobile telephony base stations or with a use of global satellite positioning system receiver.

An alternative and used on an industrial scale method for detecting use of a mobile device in a vehicle is to use vehicle-mounted short-range radio transmitter. The transmitter can be optionally activated only during operation of the vehicle, such as when the vehicle engine is running. The mobile device is equipped with a receiver compatible with the transmitter. It is assumed that the mobile device is used in a vehicle, when it is in range of the vehicle mounted transmitter. The disadvantage of this method is the necessity of an additional transmitter in the vehicle, while in the case of universal transceiver module, which is an equipment of the most modern mobile phones and some modern cars—at least a mindful configuration by a user. The configuration in this case is based on searching for a signal of the built-in transmitter of the vehicle, and storing a network address in the mobile device for future, unambiguous identification.

Patent application U.S. 2005/0255874 A1 discloses a system and method for detecting movement in a vehicle, which consists of a vehicle-mounted radio transmitter having low range, activated at a time when the vehicle is in use, and a mobile device equipped with a radio receiver. The mobile device detects that it is in the vehicle being used based on proximity of the signal of the transmitter mounted in the vehicle.

There are also ways of specifying a device context based one analysis of signals from different sensors, such as microphones, accelerometers, light sensors, magnetic field sensors, compasses, cameras and other. The information contained in the signals from the individual sensors are usually insufficient in order to determine, with a satisfactorily high degree of certainty, the device's context. Therefore, most of the known methods consist of parallel analysis of signals from multiple sensors. This leads to a substantial increase in the effectiveness of the classification, which, however, is achieved at the expense of increased power consumption, and thus a shorter time of operation of a battery-powered mobile device. The problem of reducing the energy consumption, if at all addressed in descriptions of individual methods, is typically solved by less frequent switching the sensors on and less frequent sampling. This leads, however, to extension of time after which a change of device context is detected.

The effectiveness of the classification of the signals from the individual sensors or groups of sensors, is also increased by the mechanisms of adaptive customization of classifiers' configuration based on feedback provided by users. They require the user to go through a conscious device learning process. There are also known methods for adaptation of classifiers determining the context based on the analysis of natural user interaction with the device, from which a real context at the time is determined. In the case of detecting movement in a vehicle, it may be a connection of the mobile phone to a speakerphone or executing applications for navigation. In this case, the adaptation of the classifiers' configuration, however, is much slower than in the case of intentional learning by the user. In the meantime, before the classifier's configuration adapts to the specific features indicating the contexts in which the user uses the device, the classification results can be far from satisfactory.

Patent application WO 2010/133770 A1 discloses a method of detecting a mobile device context. The method is based on retrieval of data from sensors, the data indicating a context in which the device and its user are found in, determining from the data their features, subjecting these features to a classification using an adaptive linear classifier and an adaptation of the classifier's configuration based on the designated features and feedback provided by the user of the device. Low complexity of the proposed classifier affects the low energy consumption compared to more complex methods of classification. Adaptation of configuration of the classifier based on information derived from user feedback, in turn increases the efficiency of classification. Feedback used to amend classifier's settings is provided directly by the user, indicating the correct classification result or voting positively or negatively on the result returned by the classifier, or indirectly inferred from actions taken by the user or the absence thereof.

Patent application publication U.S. 2009/0128286 discloses a system for controlling the use of electronic devices within an automobile includes a control module integrated into the operation of the automobile, wherein the control module is linked to the electrical system of the automobile and is controlled, monitored and updated via a graphical user interface of the automobile. The control module includes a mechanism for identifying use of electronic devices within the automobile, determining whether the usage is permitted and preventing usage of the electronic device if it is determined the usage is not permitted.

Patent application publication U.S. 2002/0128000 discloses a system for use with a mobile communication unit includes a service device configured to determine at least one service to be applied to affect at least one of incoming and outgoing communications to and from, respectively, the mobile communication unit, the service device being configured to determine the at least one service to be applied dependent upon a location of the mobile communication unit.

It would be desirable to define a method of detecting context of a mobile device and a mobile device having a module that enables detection of its context, which will reduce at least some of the disadvantages present in the prior art solution, and which will provide for a use of an alternative mechanism for the detection of context.

SUMMARY

The invention relates to a method for detecting a context of a mobile device equipped with sensors and a context detection module in which the sensors are assigned to at least two groups, each of which comprises at least one sensor, and each group is allocated a group classifier adapted to detect, in a form of a classification result, currently identified, by means of a given classifier, context of the device based on the indications of the sensors belonging to the given group. With a use of a context detection module, the groups of sensors are ordered hierarchically, the device context is detected by reading a classification result indicated by the classifier of the currently active group, wherein in case of detection of an identified context in the active group, there is switched on power supply of the sensors and there is activated classification in a group with a higher level and there is read the context indicated by said group's classifier, wherein based on the results of the classification indicated by the higher groups classifiers there is made an adaptation of the configuration of lower groups' classifiers.

Preferably, if the result of the classification indicated by a top level group classifier is a positive result of the classification, there is executed at least one operation from the set, which comprises: adapting user interface of the mobile device, changing of state or mode of an operating application of the mobile device, execution of an application, closing of an application, activation of a function of the mobile device, mobile device's function deactivation, changing of the configuration of the mobile device, playback of a sound signal, establishing a voice call, sending of a text message, sending of a graphical message, establishing a data connection, data transmission.

Preferably, at least one group of sensors comprises a sensor from a set, which includes: an accelerometer, a microphone, a magnetic field sensor, a compass, a light sensor, a camera, a signal strength sensor of mobile telephony base stations, a proximity sensor of a radio transmitter or relay, a receiver of satellite geographic positioning system.

Preferably, the satellite geographic positioning system receiver belongs to the group the highest level.

Preferably, the sensor groups are ordered hierarchically such that the total amount of energy required to determine a classification result in lower levels groups is less than the amount of energy required to determine the result of the classification in groups of higher levels.

Preferably, the sensors groups are ordered hierarchically in such a way that the result of the classification in groups of higher levels has lower uncertainty than the classification result of the lower levels groups.

Preferably, switching the power on for at least one sensor is based on a change of its mode of operation from a more energy efficient to a less energy efficient.

Preferably, substantially in parallel with powering on a higher level group of sensors there are powered off sensors of a lower level group.

Preferably, switching the power off for at least one sensor is based on a change of its mode of operation from a less energy efficient to a more energy efficient.

Preferably, at least one sensor is switched to a reduced power consumption after reading indication of a given sensor.

Preferably, at least one of the sensors belonging to the lowest level group has power supply switched on in a constant mode.

Preferably, there is switched on at least one of the sensors belonging to the lowest level group, periodically or according to a fixed schedule.

Preferably, the continuous powering or period or power on schedule of at least one sensor depend on the internal state of the mobile device, on the configuration of the device selected by the user, on an entry in a user's calendar or on the currently specified device's context.

Preferably, indications of the sensors assigned to a given group, are read by means of a module for determining features assigned to the given group, and adapted for determining a features vector on the basis of readings of the Sensors belonging to the given group.

Preferably, the features vector further includes readings of a sensor belonging to a group of lower level.

Preferably, in at least one classifier there is stored a set of positive patterns comprising features vectors indicating a positive result of the classification, and a set of negative patterns comprising features vectors indicating a negative result of the classification.

Preferably, at least one classifier is adapted to determine the context of the device based on the formula of "k nearest neighbors".

The invention also provides a mobile device equipped with sensors and a context detection module, in which the sensors are assigned to at least two groups, each of which comprises at least one sensor, whereas the context detection module comprises classifiers associated with specific groups, wherein each classifier is adapted to detect, in a form of a result of the classification, the currently identified, by a given context classifier, context of the device based on readings from the sensors belonging to the given group. The groups of sensors are arranged hierarchically, and the context detection module is adapted to checking the context of the device by reading the result of the classification indicated by the currently active group's classifier, whereas each classifier comprises a module for determining the classification coupled to a power supply controller, which is activated by a signal indicating a detection by the module for determining the classification of the identified context in the given group and adapted to power on a sensors group having a higher level, in order to read the context indicated by the group's classifier, whereas the classifiers further comprise an adaptation module configured to adapt the configuration of the classifier based on the results of classifications indicated by the classifiers of higher level groups.

Preferably, the device is adapted to execute, if the result of the classification indicated by a top level group classifier is a positive result of the classification, at least one operation from the set, which comprises: user interface adaptation of the mobile device, a change of state or mode of an operating application of the mobile device, execution of an application, closing of an application, activation of a function of the mobile device, mobile device's function deactivation, changing of the configuration of the mobile device, playback of a sound signal, establishing a voice call, sending of a text message, sending of a graphical message, establishing a data connection, data transmission.

Preferably, at least one group of sensors comprises a sensor from a set, which includes: an accelerometer, a microphone, a magnetic field sensor, a compass, a light sensor, a camera, a signal strength sensor of mobile telephony base stations, a proximity sensor of a radio transmitter or relay, a receiver of satellite geographic positioning system.

Preferably, the satellite geographic positioning system receiver belongs to the group the highest level.

Preferably, the sensor groups are ordered hierarchically such that the total amount of energy required to determine a classification result in lower levels groups is less than the amount of energy required to determine the result of the classification in groups of higher levels.

Preferably, the sensors groups are ordered hierarchically in such a way that the result of the classification in groups of higher levels has lower uncertainty than the classification result of the lower levels groups.

Preferably, the power supply controller is adapted to switching the power on for at least one sensor by changing its mode of operation from a more energy efficient to a less energy efficient.

Preferably, the power supply controller is adapted to, substantially in parallel with powering on a higher level group of sensors, power off sensors of a lower level group.

Preferably, switching the power off for at least one sensor is based on a change of its mode of operation from a less energy efficient to a more energy efficient.

Preferably, at least one sensor is switched to a reduced power consumption after reading indication of a given sensor.

Preferably, at least one of the sensors belonging to the lowest level group has power supply switched on in a constant mode.

Preferably, there is switched on at least one of the sensors belonging to the lowest level group, periodically or according to a fixed schedule.

Preferably, the continuous powering or period or power on schedule of at least one sensor depend on the internal state of the mobile device, on the configuration of the device selected by the user, on an entry in a user's calendar or on the currently specified device's context.

Preferably, the context detection module is equipped with modules for determining features, of which each is connected to a given group and is configured to determine a features vector on the basis of readings of the sensors belonging to the given group.

Preferably, the features vector further includes readings of a sensor belonging to a group of lower level.

Preferably, in at least one classifier there is stored a set of positive patterns comprising features vectors indicating a positive result of the classification, and a set of negative patterns comprising features vectors indicating a negative result of the classification.

Preferably, at least one classifier is adapted to determine the context of the device based on the formula of "k nearest neighbors".

An advantage of the invention is that it enables effective detection of context by powering on a minimum number of sensors, as rarely as possible and for the shortest period of time. A smaller number of powered sensors and shorter time of reading signal obtained from them means, however, a smaller amount of information and the associated higher uncertainty of the obtained classification result. It is therefore advantageous to take into account as much information from as many independent sensors, advantageously returning signal related to different physical phenomena (e.g. a microphone-acoustic wave and an accelerometer-acceleration). Thus, a solution consisting of grouping sensors and of powering on subsequent classification levels only after a positive result returned by the preceding levels, is an advantageous compromise between the first and the second option. In addition, it is to be noted that due to the huge variety of circumstances in which a used may be, it is very difficult to subject the individual classifiers to a single-time learning process, which would result in classifying correctly the signals read from the sensors in all circumstances. However, if the mobile device's user is found in circumstances that the classifier will regularly classify incorrectly, it can lead to behavior inconsistent with expectations regarding the device or regular powering on sensors belonging to the groups of high levels and subjecting to the classification the signal read from them, which in turn will lead to faster than desired use of battery energy. Consequently, the key is an adaptation mechanism for lower level classifier configuration based on classification results returned by classifiers of a higher level. Significantly, it is a mechanism which does not require any action from the user. Because of their ability to adapt, regardless of their initial configuration, the lower level classifiers adapt their configuration in such a way as to return results the most convergent with the results returned by the classifiers of higher levels in the same circumstances. After a certain number of adaptation cycles, dependent on the given circumstances and the initial configuration of the classifier, there ceases to be necessary enabling the sensors belonging to higher level groups, and subjecting the signals originating from them to classification in order to obtain a correct result for the given circumstances.

BRIEF DESCRIPTION OF THE DRAWINGS

The object of the solution has been presented in an exemplary embodiment on a drawing, in which.

DETAILED DESCRIPTION

Figure 1:
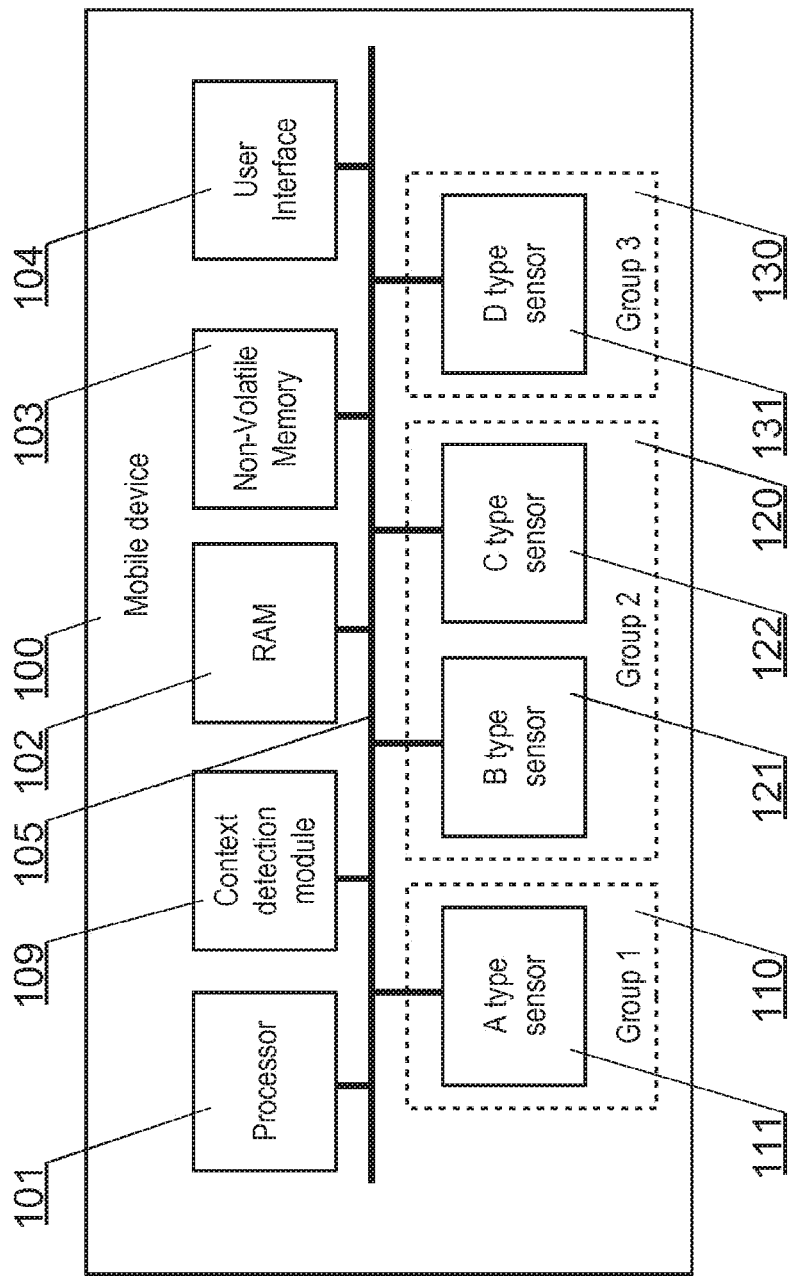
FIG. 1 presents structure of a mobile device according to the invention.

FIG. 1 shows structure of a mobile device according to the invention for example a mobile phone. A sample device 100 includes a processor 101, RAM 102, non-volatile memory 103, a user interface 104, four sensors 111, 121, 122, 131, assigned to the three groups 110, 120, 130 and a of context detection module 109, shown in details in FIG. 2.

All the circuits are connected to a bus 105, used to supply power and data signals. Assignment of sensors to groups can be of physical character and may be implemented for example in such a way that the sensors of a given group have a common power supply or a common communication bus. Assignment of sensors to groups could also be logical and can be implemented, for example, in such a way that the processor, managing operation of the system, simultaneously switches power supply on or switches mode of power supply for all the sensors belonging to the given group. FIG. 1 shows only an example of the organization of the sensors in groups—it is important to set in the device at least two groups of sensors, each of which comprises at least one sensor.

Sensors can be of different types, for example, such as an accelerometer, a microphone, a magnetic field sensor, a compass, a light sensor, a camera, a signal strength sensor of mobile phone base stations, a relay proximity sensor or a radio transmitter, a satellite geographical positioning system receiver. The term "sensor" is used in a broad sense to encompass all devices, modules or features of equipment or the software associated with them, the operating result of which are signals or values associated directly or indirectly with the device's context.

Figure 2:
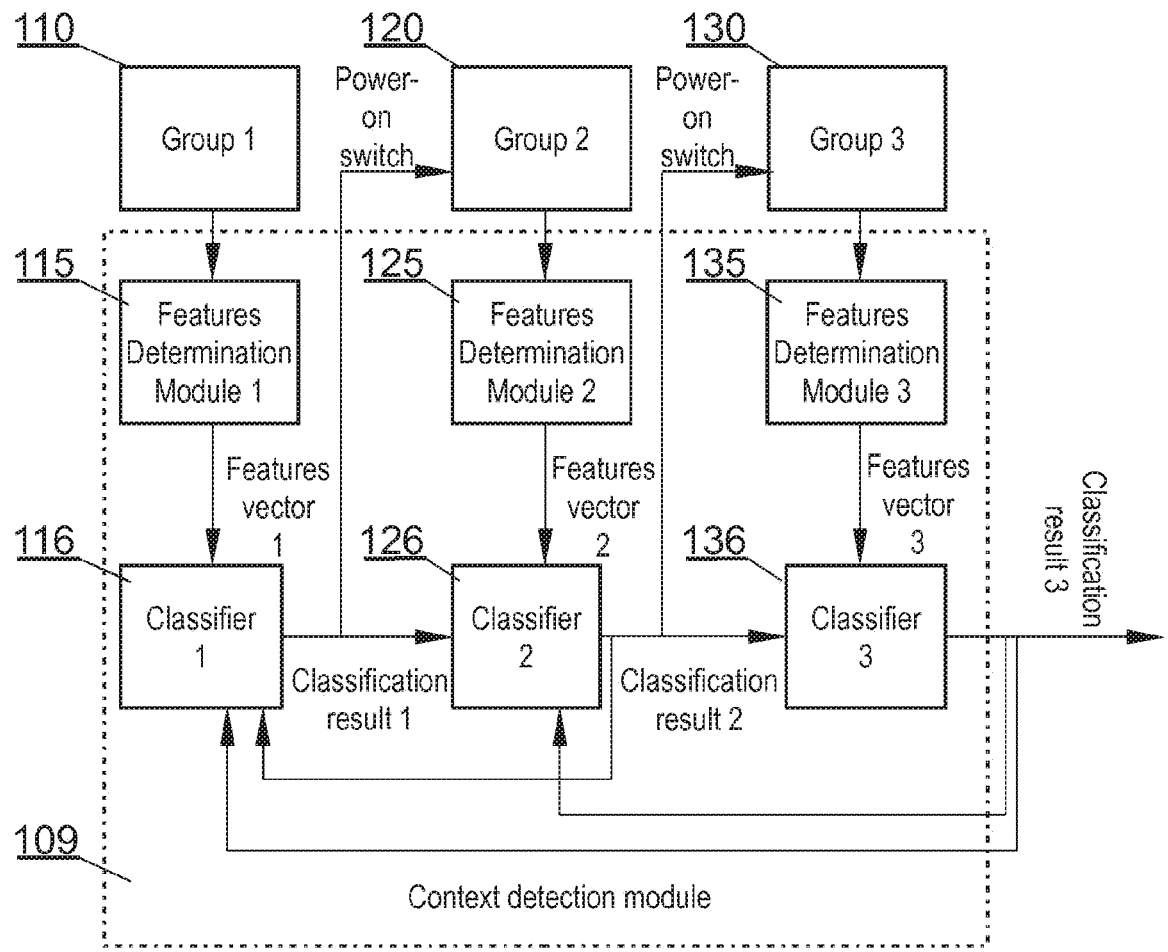
FIG. 2 shows a logical layout of signal paths between modules for detecting context of a device.

FIG. 2 shows a logical diagram of signals paths between the elements for detection of a device context in a module for context detection 109, which may be a hardware module, realized in a form of a dedicated electronic circuit, or a software module realized as a program executed by a processor 101. In the case of the module 109 realized in the form of hardware, sensors can be internal components of the module and/or the module may use the sensors, which are standard components of the device. Each group of sensors 110, 120, 130 is connected to the module for determination of features of a group of 115, 125, 135, which is connected to a group classifier 116, 126, 136. The modules for determining features 115, 125, 135, and the classifiers 116, 126, 136 may be implemented in a form of electronic circuits performing specific functions or they may for example be implemented as software stored in the non-volatile memory 103 of the device 100, loaded into RAM 102 when needed and executed by the processor 101.

Signals from the sensors may be sampled, for example with a certain frequency, for a predetermined time and stored in RAM for further analysis. For some types of sensors, however, there may be advised a different approach. For example in case of a temperature sensor it is sufficient to make a single reading. Immediately after registering the signal from the sensor, its power supply may be switched off or reading of the signals may be stopped, which can reduce energy consumption.

Thus recorded signals are sent to the module for determining features 115, 125, 135. It is preferred that if the signal from a sensor is subjected to further processing, which consists in the determining of a certain number of characterizing features of the signal. These may be, for example, features of the signal in the time domain (for example, average, minimum, maximum, range, median, standard deviation, the variance, the power of the signal) in the frequency domain (for example, the signal power spectral density for certain frequencies, the signal strength in a certain frequency bands) or the combined time-frequency domain (for example, the signal spectrogram for specific moments in time, and specific frequencies). The selection of determined signal features can be made in many ways-arbitrarily or objectively, for example, using the method of principal component analysis (PCA). For some sensors, the returned values can be directly subjected to classification, therefore, the processing as described above is not necessary. In this case, the module for determining features provides the value read from the sensor to the classifier in an unchanged form. For example, such sensor may be a temperature sensor or a light intensity sensor.

The signal features determined by the features determining modules 115, 125, 135 and/or values directly subjected to classification are then transmitted in a form of a features vector associated with the given group of sensors of the classifier 116, 126, 136. The classifier maps the features vector to a value, that indicates whether the given context is present or not. This value is referred to as "the result of the classification". The context, for the detection of which the classifier is configured will be called hereafter "the identified context", and the result of a classification indicating its occurrence is "a positive classification" or "a positive classification result". In the set of all possible contexts, supplementing the identified context will be named a "neutral context", and the result of classification indicating its presence "a negative classification" or "a negative classification result". In case the result of the classification is a binary value, one of two possible values (for example, a value of 1) indicates a positive classification, and the other (for example, 0) the negative classification. Classification results may also be a real value, directly or indirectly indicating probability, determined by the classifier, that the context is identified. In this case, determining whether the result of the classification is the positive classification or the negative classification may, for example, be a result of a comparison of the classification result with a fixed threshold value. For example, the result of a classification higher than the established threshold could indicate a positive classification, and the classification results less than or equal to a fixed threshold value can indicate a negative classification.

In the present invention the classifiers 116, 126, 136 are adaptive. By this it is meant that their configuration can be changed on the basis of feedback signals supplied to them, indicating directly or indirectly a correct classification result at a given time. An embodiment of the adaptive classifier will be presented in the following section of the description.

Groups of sensors 110, 120, 130 and associated modules for determining features 115, 125, 135, and the classifiers 116, 126, 136 are arranged hierarchically, i.e. there is determined the lowest level group and the group of the highest level and groups of intermediate levels between them. Preferably, a hierarchy of groups of sensors is chosen in such a way that the total amount of energy required to make a single classification of signals/values from the lower levels groups of sensors is less than the amount of energy required to classify the signals/values from the sensor of groups of higher levels. It is also preferred that the result of the classification of signals/values from the sensor of higher levels groups is of lower uncertainty than the result of the classification of signals/values from the lower levels sensors groups.

For example, if the context that is detected is the presence of a device in a moving vehicle, it is preferred when a satellite geographical positioning system receiver sensor belongs to the group of the highest level. Its use results in a small uncertainty burden with respect to the question of whether the mobile device is moving in a vehicle. This answer can be inferred from the manner in which the device is moved, even by comparing the speed of movement with the adopted arbitrarily threshold speed. Using a satellite positioning system receiver, however, involves considerable energy consumption, which is why it is used in a group of sensors switched on as the last one, only after a positive classification of the classifiers of all antecedent groups.

Figure 3:
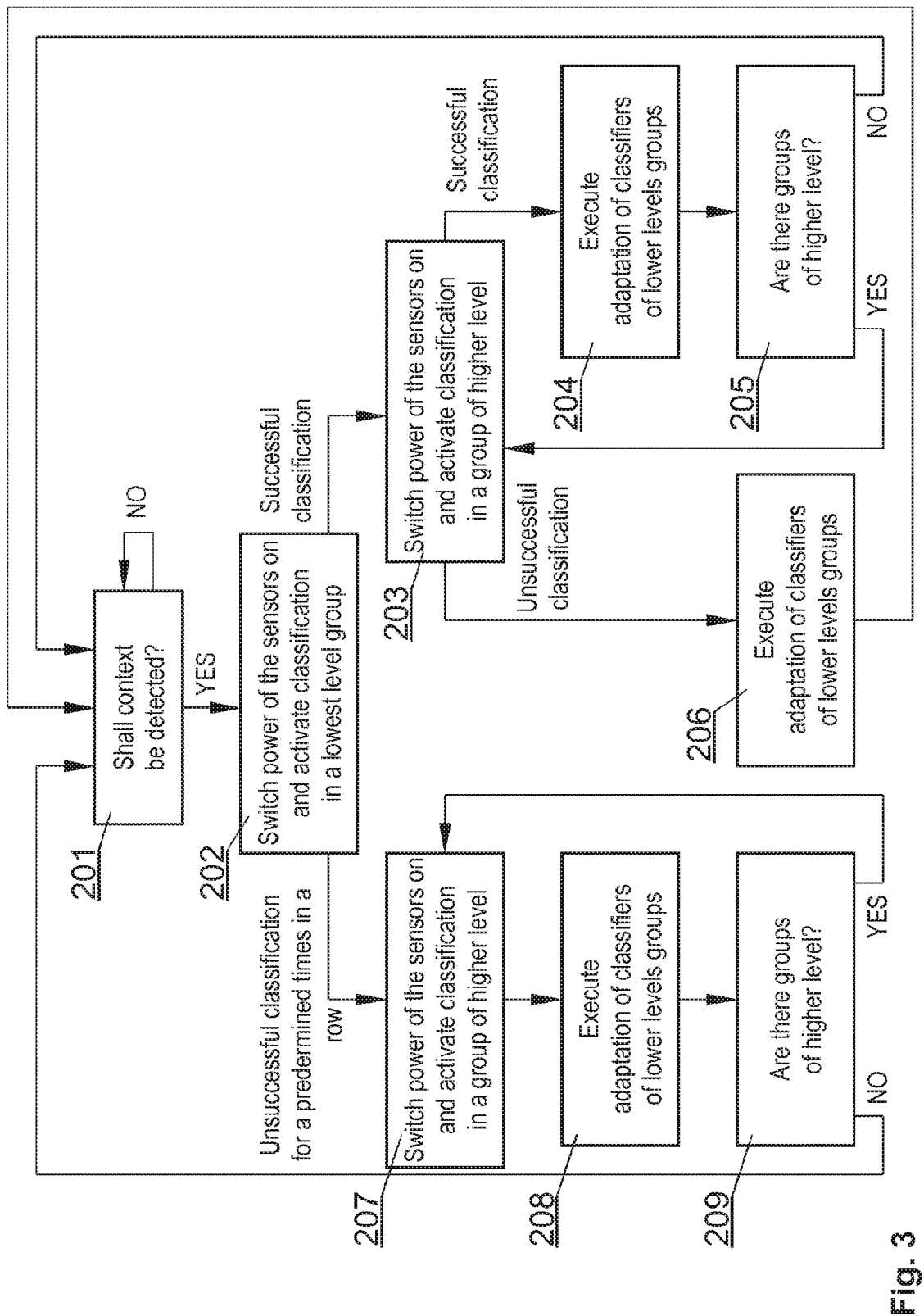
FIG. 3 presents steps of a method for detecting context.

FIG. 3 shows the steps of context detection method according to an embodiment of the invention. Switching power of the sensor on and activation of the classification of signals/values from the sensors belonging to the higher level group, as represented by step 203, occurs when the result of the classification of signals/values from the sensors group of a lower level is positive. By "powering on" a sensor it is meant both directing power supply to the sensor and change of its mode of operation from a more energy efficient to a less energy efficient. In principle together with powering on a group of sensors of higher level, there is switched off power to the lower level group of sensors, that is power is physically cut off or there is changed their mode of operation from a less energy-efficient to a more energy efficient. Switching power off for the sensors can be dependent on the type of sensor or construction of a mobile device, for example, there may be reduced switching power off for sensors having along starting time.

By "activating classification" there is meant a reading of signals/values from sensors, determination of signal characterizing features with the module for determining features and determining a result of the classification specified by the classifier based on the received features vector. Hereinafter, the term "group activation" means switching the power on for the sensors of a given group, and activation of classification of signals/values from sensors belonging to this group.

Switching power on for sensors and classification of signals/values from sensors belonging to the lowest level group, as represented by step 202, may be carried out continuously (by which it is meant also cyclic classifications run immediately one after another) or periodically. In the case of the periodic classification, the period may be fixed or variable, depending on a specific schedule or depend, for example, time of day, user's calendar, connection of the phone to a power supply or the current location of the mobile device. It is possible, for example, to extend the period during the night, at times, when the user of the device is at work or when there is in user's calendar a planned activity. These examples of ways to generate the initiating signal for the detection of context are represented by step 201.

It is preferred that at least one of the sensors belonging to the lowest level group works in a continuous manner. In the case of a mobile phone such sensor can be, for example, a radio module, which provides information on mobile telephony base station being in range and/or the strength of the signal coming from them. In the case of a mobile phone, it is impractical to disable the radio module, since the connectivity provided by it is a basic function of the device. The method according to the invention uses, in this case the possibility of frequent or even continuous classification of the signals and values returned by the sensor, which may be beneficial to lower the latency of detecting certain contexts, which include, for example, the presence of the device in a moving vehicle.

In a particular embodiment at least one of the sensors belonging to a first stage group is activated periodically or according to a fixed schedule. Turning the sensor on for a short time and off for a further period of time being preferably longer, as far as it is possible, leads to energy savings in relation to the continuous operation of the sensor. The sensor can be turned on periodically, at regular intervals or according to a predetermined schedule, such as daily, weekly, or monthly. In one preferred embodiment, the period, by which there is activated a sensor or a schedule according to which the sensor is activated depends on the internal state of a mobile device or on the device's configuration selected by the user or the user's entry in his calendar, if the device is equipped with one. For example, a period after elapsing of which a sensor shall be switched on may be extended with a decrease of the expected operation on battery power or in response to changes in device configuration, suggesting that the user wants to save battery power, for example: dimming the screen, switching off a wireless network module or disabling a short-range radio Communication module.

For example, a signal initiating detection of an identified context (for example, "the movement of the vehicle") is generated periodically at regular intervals in step 201. As a result, the detection of context begins in step 202 from activation of the group of the lowest level. If the classifier of the group returns a positive classification result, in step 203 there is activated a group higher by one level. If this group's classifier returns a positive classification result, an adaptation is performed of classifiers of groups of lower levels in step 204, and then there is a verification whether there are still groups of higher levels in step 205. If yes, there is a return to step 203 and activation of the next higher level group. If not, the process moves to step 201, which is to wait for a signal initiating detection of context. If, however, in step 203 a classifier returns a negative classification result, there is carried out adaptation of classifiers of groups of the lower levels 206, and then the method proceeds directly to step 201.

In the case of a positive classification in step 202, there is always a result of classification of higher level group classifier that can be used to adapt the lower level group classifier. In this way, the lower-level group classifier "learns" from the higher level group classifier, especially in situations where the lower-level group classifier incorrectly returns a positive result. Adaptation leads to customization of configuration of the lower level group classifier to specific characteristics of the environment in which the user is present at a given time, thereby increasing the efficiency of classification, and particularly its selectivity. Since each positive classification of a classifier of a lower level group leads to powering on sensors belonging to the higher level group, and less frequent return of erroneous, positive results translates into lower energy consumption.

To avoid a situation in which the lower levels classifiers cannot for a long time properly detect identified context, in step 207 there may be, for example, activated a higher level group, even when the lowest level classifier returns a negative result, for example, when there was a negative classification for a predetermined number of times in a row. In this case, regardless of the result of the classification of the classifier of the group of higher level, there is executed an adaptation of the lower levels groups classifiers in step 208 and there is checked whether there are more groups of higher level, in step 209. If yes, the process returns to step 207, by activating the next higher level group. If not, the process moves to step 201, which is to wait for the signal initiating context detection. The presented procedure can increase the sensitivity of the classifiers that incorrectly return negative classification results despite the presence of the identified context.

The presented method for detecting a context uses at any given time only the sensors belonging to one group. Other sensors can be turned off at this time, which significantly reduces the energy consumed by the device in order to detect context. Low power consumption is achieved in particular by the fact that in the event of presence of the neutral context, context detection usually ends at the activation of only the lowest level group (step 202).

In any case, when a higher level group is activated (steps 203, 207), there are temporarily stored both the feature vector being subject to classification and the result of classification of a lower level group classifier. Together with the result of classification of higher level group classifier, which is transmitted to the lower level group classifier, they are used to adapt the configuration of the lower level group classifier (steps 204, 206, 208). Preferably, in steps 204, 206 and 208 there are made adaptations to the configuration of classifiers belonging to all lower level groups.

Figure 4:
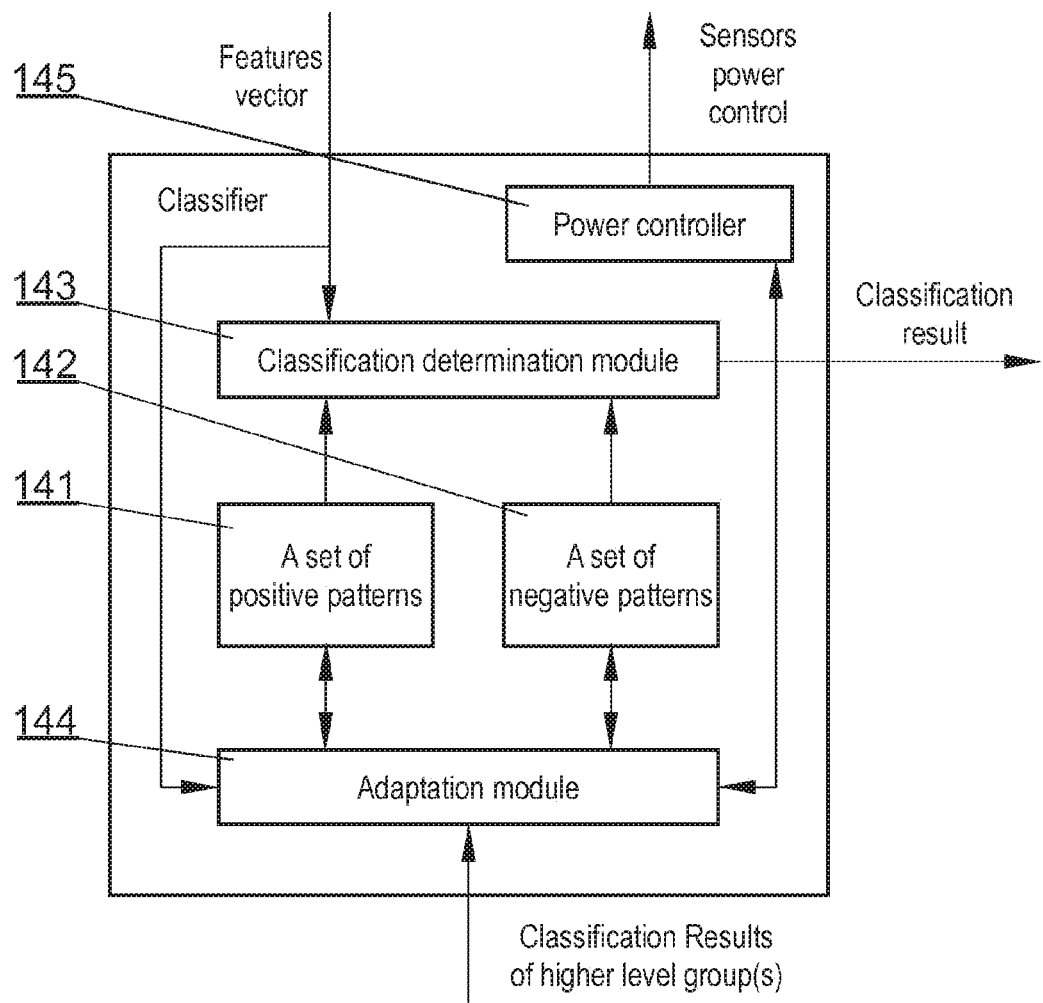
FIG. 4 shows a classifier's schematic diagram.

In the present invention, an adaptive classifier could be implemented in many different ways. An example of a preferred embodiment of the classifier is shown in FIG. 4 it is a modified version of a typical classifier algorithm based on the "k nearest neighbors". This classifier is based on a separate set of patterns for each class where each pattern is a features vector in a form the same, as the features given as input parameters for classification. The classifier is complemented by its configuration adapting mechanism, which consists of additions, deletions and exchanging patterns in the sets. In the case of binary classification, the classifier is based on two sets of patterns 141, 142 One set contains patterns corresponding the identified context and will be hereinafter referred to as "the set of positive patterns" 141. The second set, however, contains patterns corresponding to the neutral context and will be hereinafter referred to as "a set of negative patterns," 142. Each pattern is a vector containing a set of features determined from of the signals from the sensors of a given group and/or values directly subjected to classification. The number of patterns in each set can be arbitrary. Preferably, however, due to the effectiveness of the classification, there are not less than 50 in each set. Preferably also due to limiting the amount of computations required for determining classification result, there are no more than 1,000 in each set. The classifier has a predefined collection of patterns derived from the signals recorded in a variety of conditions and representing an identified and neutral context.

The classification consists of determining by the module for determining classification 143 the distance of features vector, read from the module for determining features, to each pattern in both sets 141, 142. Then, the determined distances are sorted from the smallest to the largest while keeping association with a specific pattern, to which a specific distance is related. If one of 'k' first patterns with the smallest distance from the features vector subjected to classification most are within the set of positive patterns, the result of classification is positive. Otherwise, the result of classification is negative. The "k" parameter is a natural number not less than 1. In order to avoid a situation where the number of representatives from both sets will be equal among the "k" first patterns with the smallest distance from the classified features vector, "k" should be an odd number. The distance between the features vector subject to classification and the patterns, can be calculated in many ways, for example—as the Euclidean distance or Mahalanobis distance. The classification result is given as the output of both the classifier, as well as the power controller 145, which in the case of obtaining a positive result of the classification switches on power to a higher level group of sensors.

In a particular embodiment, at least one feature of the signal from the sensor being a member of the group of a higher level is subjected to classification together with at least one feature of a signal from a sensor belonging to a group of a lower level. According to the method of the invention, classifiers belonging to the groups of level higher than 1, are activated in response to as positive result of the classification from the classifier, belonging to the lower level group. Therefore, the feature vector classifier subject to classification by a classifier of a higher level group can be supplemented with any or all of the features previously subject to classification by classifiers belonging to groups of lower level without incurring additional cost of determining these features. Between individual features, which are determined from the signals from the sensors belonging to different groups, there may be relationships specific to the identified and/or neutral context. If these features are subject to classification by independent classifiers, these relationships do not affect the result of the classification. Therefore, the overall efficiency of classification can benefit from taking into account by the classifier belonging to the higher level group also features that were previously subjected to classification by the classifiers belonging to the lower level group.

Figure 5:
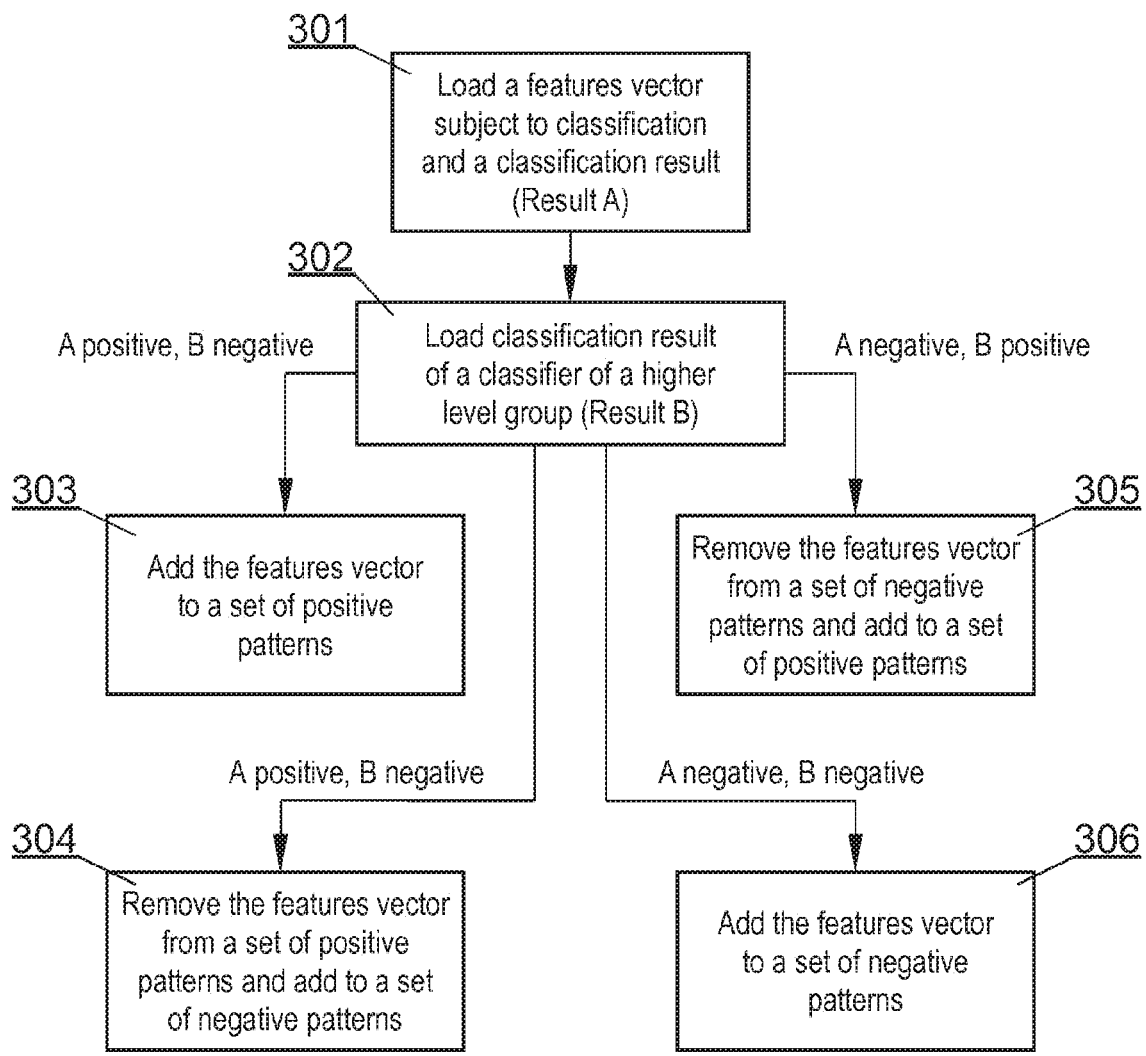
FIG. 5 shows steps of a method for adapting classifier's configuration.

In the illustrated embodiment, the adaptation of the classifier's configuration is realized by the adaptation module 144 in accordance with the flow diagram shown in FIG. 5. First, there is loaded a stored, after the last classification, features vector subjected to classification (vector A) and the result of the last classification, hereinafter "the result A" 301. Then there is read the result of the classification of another classifier, belonging to a higher level group, which is to be used to adapt the configuration of the classifier (result B) 302.

If result A and result B are positive, the vector A is added to a set of positive patterns 303.

If the result A is positive and result B negative, there is deleted, from the set of positive patterns, the pattern having the lowest distance to vector A and there is added vector A to a set of negative patterns 304.

If the result A is negative and result B is positive, there is deleted from the set of negative patterns, the pattern of lowest distance from vector A and there is added vector A to a set of positive patterns 305.

If the result A and result B are negative, there is added the vector A to a set of negative patterns 306.

If by addition of the vector A to the set of patterns, the number of patterns in the set would exceed the maximum number, then the distance is calculated between all pairs of patterns in the set, and there is found a pair of closest patterns (N patterns), and there is determined a distance between the patterns (distance N). Then there is determined a distance between the vector A and all the patterns in the set and there is found a pattern with the shortest distance from the vector A (distance A). If the distance N is less than the distance A, there is replaced one of the N patterns (any) with the vector A.

Changing of the operating mode of the mobile device in response to detection of the identified context, for example, movement in a vehicle, can also be associated with switching a mode of classifiers and sensors operation to a different cycle than in detection mode—for example, more frequent, periodic activation of all groups. Such circumstances can also be used for the adaptation of the individual classifiers in order to increase their sensitivity.

The present invention can be used in various mobile devices, such as mobile phones, laptops, PDAs, tablets, watches, music players, satellite navigation devices, cameras.

In case when a detected context is the presence of a mobile device in a moving vehicle, the invention is applicable in particular to vehicles, such as cars, but may also be used with other vehicles, such as motorcycles, scooters, mopeds and trains.

The solutions presented in the description are only exemplary and of many possible implementations of the solution according to the present invention.

For example, it is possible to detect more than one identified context. In this case, the organization of the sensors in groups may be one for all the identified contexts or different for each other identified context. In case a single organization of sensors in groups for all identified contexts, in a given group, with each identified context there may be associated an independent classifier.

Alternatively, individually in each group there may be used, for example, a single classifier configured to detect more than one identified context. In this case, the detection of any of the identified contexts can lead to activation of appropriate group of higher level, in which there will be used a classifier associated with the identified context. If a classifier of this type belongs to a group of level higher than the first level, each classification result, indicating a different context than the identified context in the lower level group, may considered as a negative classification result, or if the result of the classification of the group of higher level indicated a different context than in the group of lower level, the result of the higher level group may be assumed as proper.

The classifier adaptation algorithm based on the "k nearest neighbors" to detect more than one identified context, may occur similarly as in case of a binary classifier, except that there will be supplemented/modified different sets of patterns—but always in such a way as to add a features vector to the set associated with the context indicated by the classifier of higher level group and to remove a vector from the set associated with the erroneously detected, at the given time, context.

If the result, of the classification of a higher level group classifier, used for adaptation of a classifier of a group of lower level there is related a value that indicates, at least indirectly, on the assurance of the outcome, the process of adaptation may be made dependent on this value. For example, the simplest way may be to compare said value with a certain threshold and to make the adaptation only when the confidence result of said classification is high. Alternatively, there may also be used classifiers defining more than one neutral context. In this case, the type of detected neutral context may indirectly carry information on certainty of the obtained negative classification result-therefore the kind of neutral context may influence the adaptation of classifiers of groups of lower levels.

An exemplary, preferred method of modification of the present invention may also involve suppressing activation of groups of higher levels when obtained at the given time positive classification result in a group of lower level (at step 202 or 203) is defined with a sufficiently high degree of certainty for a given application. In this case, after a possible adaptation of the lower levels groups classifiers in step 204, regardless of whether there are groups of higher levels or not, the method proceeds to await a signal initiating the next cycle of detection of context 201. The result of the classification of the complete module for context detection 109, is in this case, the classification result returned by the classifier, belonging to the group at which the detection of context has been completed.

What is claimed is:

1. A mobile device, comprising:
a plurality of sensors and a plurality of sensor groups, wherein each of the sensor groups is assigned at least one of the sensors, and wherein the plurality of sensor groups are arranged hierarchically; and
a plurality of classifiers, wherein each classifier is assigned to a sensor group, and
wherein each classifier is configured to evaluate one or more contexts of the mobile device based on signals from one or more sensors assigned to the same sensor group as the classifier;
wherein the mobile device is configured to:
activate a classification by a classifier assigned to a first sensor group to evaluate a first context of the mobile device;
activate a classification by a classifier assigned to a second sensor group to evaluate the first context of the mobile device after a result of the classification by the classifier assigned to the first sensor group; and adapt a configuration of the classifier assigned to the first sensor group based, at least in part, on a result of the classification by the classifier assigned to the second sensor group.

2. The mobile device of claim 1, wherein at least one of the sensor groups is assigned two or more of the classifiers.

3. The mobile device of claim 2, wherein the two or more classifiers assigned to the same sensor group are configured to evaluate different contexts of the mobile device.

4. The mobile device of claim 1, wherein at least one of the classifiers is configured to evaluate a plurality of contexts of the mobile device.

5. The mobile device of claim 1, wherein one or more of the classifiers provide a numerical result that directly or indirectly indicates a probability of an identified context of the mobile device.

6. The mobile device of claim 5, wherein a result of a classification by the one or more classifiers that provide the numerical result is determined by comparing the numerical result to a threshold value.

7. The mobile device of claim 1, wherein classification by the classifier assigned to the first sensor group to evaluate the first context of the mobile device is performed continuously.

8. The mobile device of claim 1, wherein classification by the classifier assigned to the first sensor group to evaluate the first context of the mobile device is performed periodically.

9. The mobile device of claim 8, wherein the periodic classification comprises a variable period.

10. The mobile device of claim 9, wherein the variable period is dependent upon a location of the mobile device.

11. The mobile device of claim 1, wherein the mobile device is configured to change a mode of operation of one or more sensors assigned to the second sensor group from a first power state to a second power state when the classification by the classifier assigned to the second sensor group is activated.

12. The mobile device of claim 1, wherein the mobile device is configured to activate the classification by the classifier assigned to the second sensor group when the result of the classification by the classifier assigned to the first sensor group is positive.

13. The mobile device of claim 1, wherein the mobile device is configured to activate the classification by the classifier assigned to the second sensor group when the result of the classification by the classifier assigned to the first sensor group is negative.

14. The mobile device of claim 1, wherein classification comprises:
reading signals from the one or more sensors assigned to the same sensor group as the classifier;
determining characterizing features of the signals; and
determining the result of the classification by the classifier.

15. The mobile device of claim 1, wherein the mobile device is configured to activate the classification by the classifier assigned to the second sensor group when a confidence level of the result of the classification by the classifier assigned to the first sensor group is below a threshold.

16. The mobile device of claim 1, wherein the plurality of sensor groups are arranged hierarchically such that a total amount of energy required to determine a classification result in lower levels groups is less than an amount of energy required to determine a result of the classification in groups of higher levels.

17. The mobile device of claim 1, wherein the plurality of sensor groups are arranged hierarchically in such a way that a result of the classification in groups of higher levels has lower uncertainty than the classification result of lower levels groups.

18. The mobile device of claim 1, wherein the plurality of sensor groups are arranged hierarchically where there is a lowest level group, a highest level group, and an intermediate levels group.

19. The mobile device of claim 1, wherein the plurality of sensors include one or more of: an accelerometer, a microphone, a magnetic field sensor, a compass, a light sensor, a camera, a signal strength sensor of mobile telephony base stations, a proximity sensor of a radio transmitter or relay, and/or a receiver of satellite geographic positioning system.

20. A mobile device, comprising:
a plurality of sensors and a plurality of sensor groups, wherein each of the sensor groups is assigned at least one of the sensors, and wherein the plurality of sensor groups are arranged hierarchically; and
a plurality of classifiers, wherein each classifier is assigned to a sensor group, and
wherein each classifier is configured to evaluate one or more contexts of the mobile device based on signals from one or more sensors assigned to the same sensor group as the classifier;
wherein the mobile device is configured to:
evaluate a first context of the mobile device by activating classification using at least two of the classifiers in sequence; and
adapt a configuration of a classifier based, at least in part, on a result of a classification by another classifier.

21. The mobile device of claim 20, wherein activating classification using at least two of the classifiers in sequence comprises activating a classification by a subsequent classifier after a positive classification by a prior classifier.

22. The mobile device of claim 20, wherein activating classification using at least two of the classifiers in sequence comprises activating a classification by a subsequent classifier after a negative classification by a prior classifier.

23. The mobile device of claim 20, wherein the mobile device is further configured to evaluate a second context of the mobile device by activating classification using at least two of the classifiers in sequence.

24. The mobile device of claim 20, wherein the plurality of sensor groups are arranged hierarchically such that a total amount of energy required to determine a classification result in lower levels groups is less than an amount of energy required to determine a result of the classification in groups of higher levels.

25. The mobile device of claim 20, wherein the plurality of sensor groups are arranged hierarchically in such a way that a result of the classification in groups of higher levels has lower uncertainty than the classification result of lower levels groups.

26. The mobile device of claim 20, wherein the plurality of sensor groups are arranged hierarchically where there is a lowest level group, a highest level group, and an intermediate levels group.

27. The mobile device of claim 20, wherein the plurality of sensors include one or more of: an accelerometer, a microphone, a magnetic field sensor, a compass, a light sensor, a camera, a signal strength sensor of mobile telephony base stations, a proximity sensor of a radio transmitter or relay, and/or a receiver of satellite geographic positioning system.

28. A method for detecting a context of a mobile device equipped with a plurality of sensors, comprising:

assigning the plurality of sensors to a plurality of sensor groups, wherein each sensor group is assigned at least one sensor, and wherein the plurality of sensor groups are arranged hierarchically;

activating a classification by a subsequent classifier after a result of a classification by a prior classifier; and adapting a configuration of the prior classifier based, at least in part, on a result of the classification by the subsequent classifier.

29. The method of claim 28, wherein the plurality of sensor groups are arranged hierarchically such that a total amount of energy required to determine a classification result in lower levels groups is less than an amount of energy required to determine a result of the classification in groups of higher levels.

30. The method of claim 28, wherein the plurality of sensor groups are arranged hierarchically in such a way that a result of the classification in groups of higher levels has lower uncertainty than the classification result of lower levels groups.

31. The method of claim 28, wherein the plurality of sensor groups are arranged hierarchically where there is a lowest level group, a highest level group, and an intermediate levels group.

32. The method of claim 28, wherein the plurality of sensors include one or more of: an accelerometer, a microphone, a magnetic field sensor, a compass, a light sensor, a camera, a signal strength sensor of mobile telephony base stations, a proximity sensor of a radio transmitter or relay, and/or a receiver of satellite geographic positioning system.

* * * * *